United States Patent
Mullennex

(10) Patent No.: US 11,009,352 B2
(45) Date of Patent: May 18, 2021

(54) WATER LINE MAPPING ASSEMBLY

(71) Applicant: Nathan Mullennex, Healdton, OK (US)

(72) Inventor: Nathan Mullennex, Healdton, OK (US)

(*) Notice: Subject to any disclaimer, the term of this patent is extended or adjusted under 35 U.S.C. 154(b) by 282 days.

(21) Appl. No.: 16/351,165

(22) Filed: Mar. 12, 2019

(65) Prior Publication Data
US 2020/0292315 A1 Sep. 17, 2020

(51) Int. Cl.
- *G01C 21/14* (2006.01)
- *G01C 21/20* (2006.01)
- *G01C 15/10* (2006.01)
- *F16L 55/26* (2006.01)

(52) U.S. Cl.
CPC .......... *G01C 21/14* (2013.01); *G01C 15/10* (2013.01); *G01C 21/20* (2013.01); *F16L 55/265* (2013.01)

(58) Field of Classification Search
CPC ........ G01C 21/14; G01C 15/10; G01C 21/20; G01C 15/00; F16L 55/265; F16L 2101/30; F16L 55/38; F16L 55/48; G01S 19/51

See application file for complete search history.

(56) References Cited

U.S. PATENT DOCUMENTS

| | | | |
|---|---|---|---|
| 6,751,553 B2 | 6/2004 | Young | |
| 6,904,361 B1 | 6/2005 | Tallman | |
| 7,856,312 B2 | 12/2010 | Coombes | |
| 8,170,715 B1 | 5/2012 | Vallapuzha | |
| D686,098 S | 7/2013 | Agar | |
| 2016/0061374 A1* | 3/2016 | Bichler | G06K 7/10366 138/97 |
| 2016/0282121 A1 | 9/2016 | Kim | |
| 2018/0177064 A1* | 6/2018 | van Pol | G01D 11/245 |

* cited by examiner

*Primary Examiner* — Brian P Sweeney

(57) ABSTRACT

A water line mapping assembly includes a remote unit that is held by a user. The remote unit has a remote transceiver that is in electrical communication with a global positioning system (gps). A capsule is provided that has an outside diameter sufficiently small to fit into a buried pipe. The capsule is comprised of a buoyant material to float in the buried pipe, and the capsule is comprised of a fluid impermeable material. A tracking unit is positioned inside the capsule and the tracking unit is in wireless electrical communication with the gps. Thus, the gps can establish a depth and a position of the tracking unit when the capsule is positioned in the buried pipe. The tracking unit is in electrical communication with the remote unit thereby facilitating the remote unit to display the depth and position of the tracking unit. In this way the remote unit can map the buried pipe.

6 Claims, 3 Drawing Sheets

WATER LINE MAPPING ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to mapping devices and more particularly pertains to a new mapping device for mapping buried water lines.

BRIEF SUMMARY OF THE INVENTION

An embodiment of the disclosure meets the needs presented above by generally comprising a remote unit that is held by a user. The remote unit has a remote transceiver that is in electrical communication with a global positioning system (gps). A capsule is provided that has an outside diameter sufficiently small to fit into a buried pipe. The capsule is comprised of a buoyant material to float in the buried pipe, and the capsule is comprised of a fluid impermeable material. A tracking unit is positioned inside the capsule and the tracking unit is in wireless electrical communication with the gps. Thus, the gps can establish a depth and a position of the tracking unit when the capsule is positioned in the buried pipe. The tracking unit is in electrical communication with the remote unit thereby facilitating the remote unit to display the depth and position of the tracking unit. In this way the remote unit can map the buried pipe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
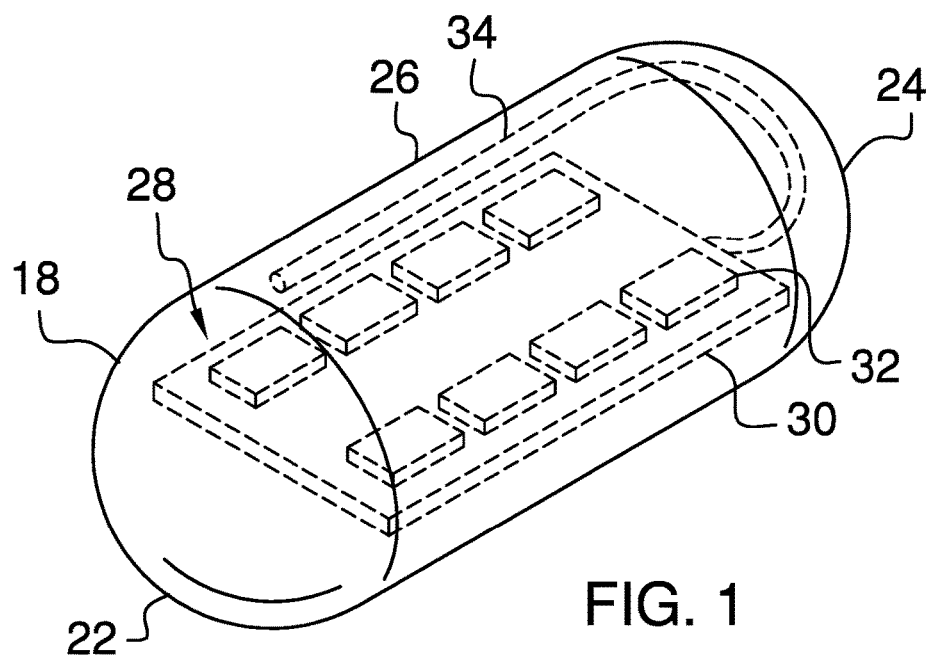
FIG. 1 is a phantom perspective view of a capsule of a water line mapping assembly according to an embodiment of the disclosure.
Figure 2:
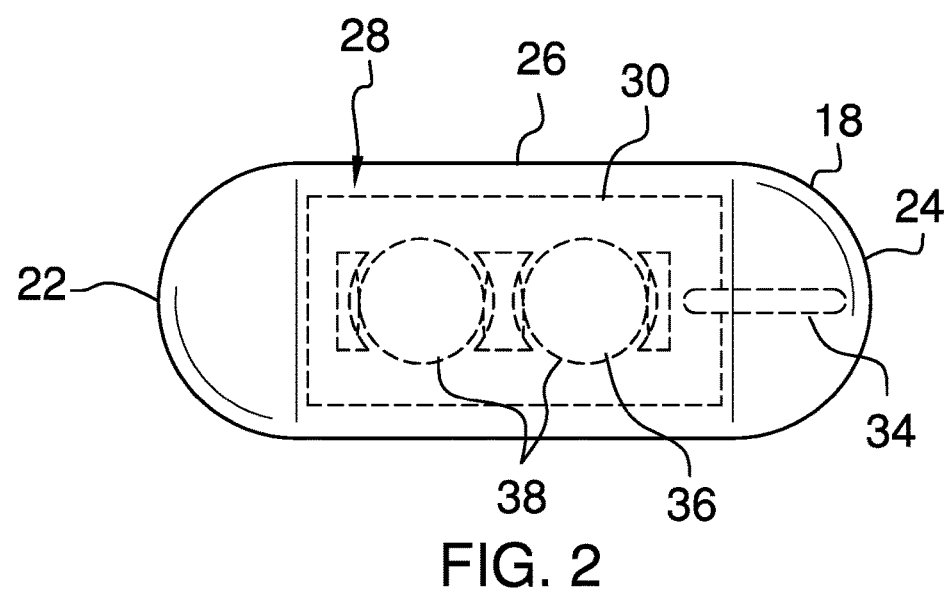
FIG. 2 is a bottom phantom view of a capsule of an embodiment of the disclosure.
Figure 3:
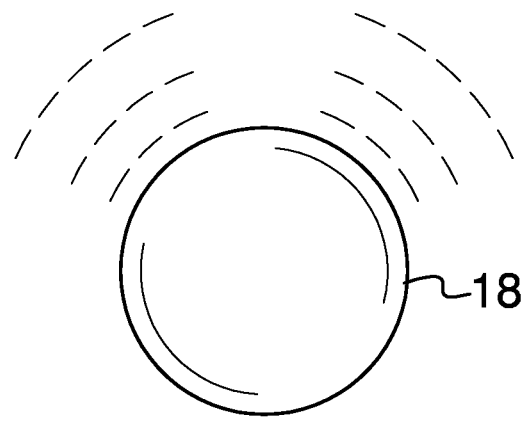
FIG. 3 is a front view of a capsule of an embodiment of the disclosure.
Figure 4:
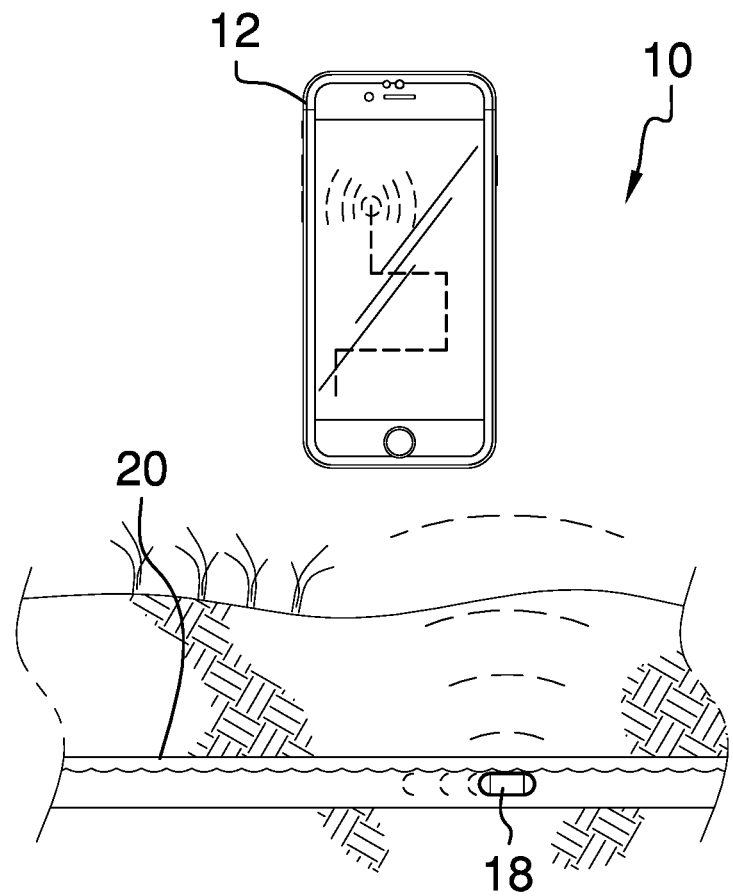
FIG. 4 is a perspective in-use view of an embodiment of the disclosure.
Figure 5:
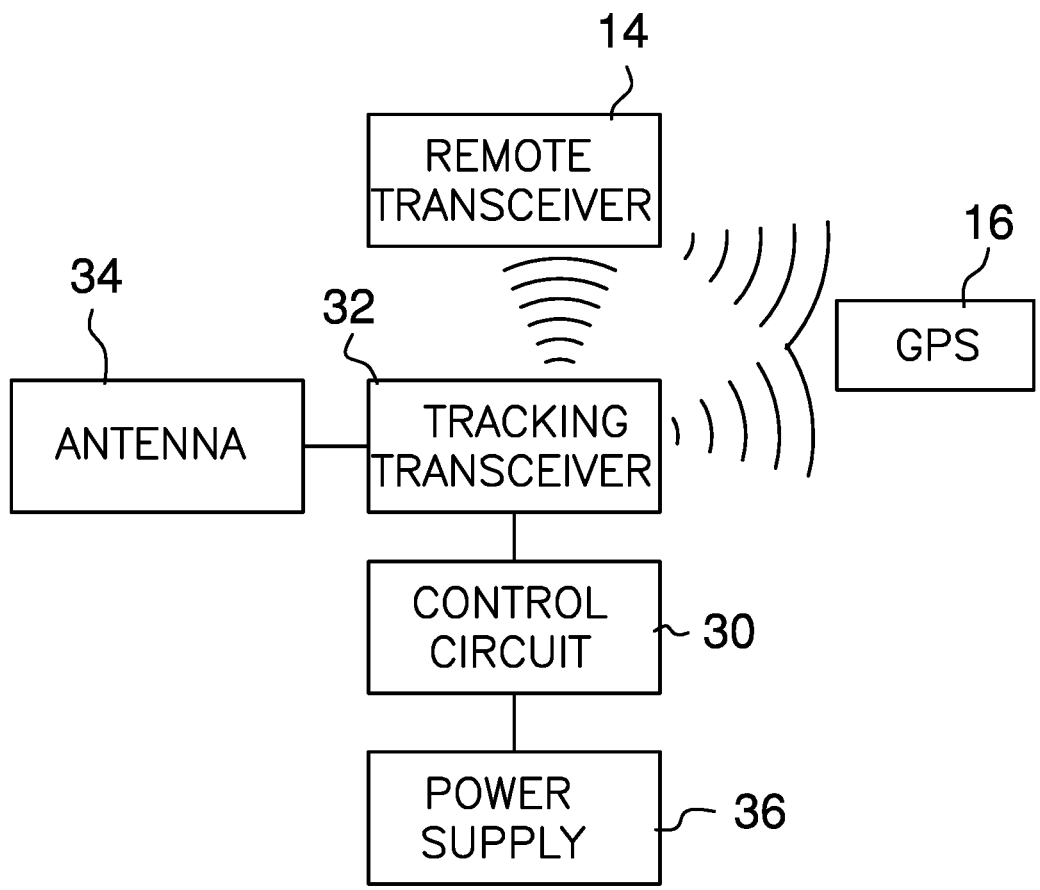
FIG. 5 is a schematic view of an embodiment of the disclosure.

With reference now to the drawings, and in particular to FIGS. 1 through 5 thereof, a new mapping device embodying the principles and concepts of an embodiment of the disclosure and generally designated by the reference numeral 10 will be described.

As best illustrated in FIGS. 1 through 5, the water line mapping assembly 10 generally comprises a remote unit 12 is held by a user. The remote unit 12 has a remote transceiver 14 that is in electrical communication with a global positioning system (gps) 16. The remote unit 12 may be a smart phone or other similar commonly available, consumer electronic device. A capsule 18 is included that has an outside diameter being sufficiently small to fit into a buried pipe 20. The buried pipe 20 may be a municipal water pipe, an oil pipeline, a private water pipe or any other pipe that has been buried.

The capsule 18 has a first end 22, a second end 24 and an outer wall 26 extending therebetween, and the capsule 18 is elongated between the first 22 and second 24 ends. The outer wall 26 is continuously arcuate about an axis extending through the first 22 and second 24 ends such that the capsule 18 has a cylindrical shape. Thus, the capsule 18 conforms to the curvature of the interior of the buried pipe 20 thereby facilitating the capsule 18 to easily travel down the buried pipe 20. The capsule 18 is comprised of a buoyant material thereby facilitating the capsule 18 to float in the buried pipe 20. Additionally, the capsule 18 is comprised of a fluid impermeable material.

A tracking unit 28 is provided, the tracking unit 28 is positioned inside the capsule 18 and the tracking unit 28 is in wireless electrical communication with the gps 16. Thus, the gps 16 can establish a depth and a position of the tracking unit 28 when the capsule 18 is positioned in the buried pipe 20. Moreover, the tracking unit 28 is in electrical communication with the remote unit 12 thereby facilitating the remote unit 12 to display the depth and position of the tracking unit 28. In this way the remote unit 12 can map the buried pipe 20 on mapping software or the like that is stored in the remote unit 12.

The tracking unit 28 comprises a control circuit 30 that is positioned within the capsule 18. A tracking transceiver 32 is positioned within the capsule 18 and the tracking transceiver 32 is electrically coupled to the control circuit 30. Additionally, the tracking transceiver 32 is in electrical communication with the gps 16 and the remote transceiver 14. The tracking transceiver 32 may be a radio frequency transceiver or the like that has a signal strength sufficient to penetrate several feet of earth.

An antenna 34 is positioned within the capsule 18. The antenna 34 is electrically coupled to the tracking transceiver 32 for increasing the signal strength of the tracking transceiver 32. The antenna 34 may include an amplifier or other similar component. A power supply 36 is positioned within the capsule 18, the power supply 36 is electrically coupled to the control circuit 30 and the power supply 36 comprises at least one battery 38.

In use, the remote unit 12 is synched with the tracking unit 28 to turn the tracking unit 28 on. The supply end of the buried pipe 20 is disconnected and the capsule 18 is inserted into the supply end. The supply end of the buried pipe 20 is reconnected and water is turned on. Thus, the capsule 18 is floated down the length of the buried pipe 20 while the tracking unit 28 broadcasts its gps 16 location to the remote unit 12. Thus, the remote unit 12 can build a map of the buried pipe 20 based on the gps 16 information received from the tracking unit 28. Additionally, the depth of the buried pipe 20 can be recorded along its entire length. In this way any existing buried pipe 20 can be located and mapped prior to excavation or the like. Additionally, the tracking unit 28 will stop travelling in the buried pipe 20 at a break or obstruction thereby facilitating the break or obstruction to be located and repaired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A water line mapping assembly being configured to be floated down buried water lines thereby facilitating the water lines to be mapped, said assembly comprising:
   a remote unit being held by a user, said remote unit having a remote transceiver being in electrical communication with a global positioning system (gps);
   a capsule having an outside diameter being sufficiently small to fit into an buried pipe, said capsule being comprised of a buoyant material wherein said capsule is configured to float in the buried pipe, said capsule being comprised of a fluid impermeable material; and
   a tracking unit being positioned inside said capsule, said tracking unit being in wireless electrical communication with the gps thereby facilitating the gps to establish a depth and a position of said tracking unit when said capsule is positioned in the buried pipe, said tracking unit being in electrical communication with said remote unit thereby facilitating said remote unit to display the depth and position of said tracking unit wherein said remote unit is configured to map the buried pipe.

2. The assembly according to claim 1, wherein said capsule has a first end, a second end and an outer wall extending therebetween, said capsule being elongated between said first and second ends, said outer wall being continuously arcuate about an axis extending through said first and second ends such that said capsule has a cylindrical shape wherein said capsule is configured to conform to the curvature of the interior of the buried pipe.

3. The assembly according to claim 1, wherein said tracking unit comprises:
   a control circuit being positioned within said capsule; and
   a tracking transceiver being positioned within said capsule, said tracking transceiver being electrically coupled to said control circuit, said tracking transceiver being in electrical communication with the gps, said tracking transceiver being in electrical communication with said remote transceiver.

4. The assembly according to claim 3, further comprising an antenna being positioned within said capsule, said antenna being electrically coupled to said tracking transceiver for increasing a signal strength of said tracking transceiver.

5. The assembly according to claim 4, further comprising a power supply being positioned within said capsule, said power supply being electrically coupled to said control circuit, said power supply comprising at least one battery.

6. A water line mapping assembly being configured to be floated down buried water lines thereby facilitating the water lines to be mapped, said assembly comprising:
   a remote unit being held by a user, said remote unit having a remote transceiver being in electrical communication with a global positioning system (gps);
   a capsule having an outside diameter being sufficiently small to fit into an buried pipe, said capsule having a first end, a second end and an outer wall extending therebetween, said capsule being elongated between said first and second ends, said outer wall being continuously arcuate about an axis extending through said first and second ends such that said capsule has a cylindrical shape wherein said capsule is configured to conform to the curvature of the interior of the buried pipe, said capsule being comprised of a buoyant material wherein said capsule is configured to float in the buried pipe, said capsule being comprised of a fluid impermeable material; and
   a tracking unit being positioned inside said capsule, said tracking unit being in wireless electrical communication with the gps thereby facilitating the gps to establish a depth and a position of said tracking unit when said capsule is positioned in the buried pipe, said tracking unit being in electrical communication with said remote unit thereby facilitating said remote unit to display the depth and position of said tracking unit wherein said remote unit is configured to map the buried pipe, said tracking unit comprising:
   a control circuit being positioned within said capsule;

a tracking transceiver being positioned within said capsule, said tracking transceiver being electrically coupled to said control circuit, said tracking transceiver being in electrical communication with the gps, said tracking transceiver being in electrical communication with said remote transceiver;

an antenna being positioned within said capsule, said antenna being electrically coupled to said tracking transceiver for increasing a signal strength of said tracking transceiver; and a power supply being positioned within said capsule, said power supply being electrically coupled to said control circuit, said power supply comprising at least one battery.

\* \* \* \* \*